(12) United States Patent
Alkhateeb

(10) Patent No.: US 11,618,228 B2
(45) Date of Patent: Apr. 4, 2023

(54) SEALING DEVICE FOR TUBELESS TIRES

(71) Applicant: King Abdulaziz University, Jeddah (SA)

(72) Inventor: Abdulhameed Fouad A Alkhateeb, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/349,422

(22) Filed: Jun. 16, 2021

(65) Prior Publication Data

US 2022/0055419 A1 Feb. 24, 2022

Related U.S. Application Data

(62) Division of application No. 16/997,990, filed on Aug. 20, 2020, now Pat. No. 11,065,919.

(51) Int. Cl.
*B29D 30/06* (2006.01)
*B60C 19/12* (2006.01)

(52) U.S. Cl.
CPC ........ *B29D 30/0685* (2013.01); *B60C 19/122* (2013.01); *B29D 2030/0686* (2013.01)

(58) Field of Classification Search
CPC ..... B60C 19/002; B60C 19/12; B60C 19/122; B60C 19/125; B60C 5/14; B60C 5/142; B60C 2005/145; B29D 30/0016; B29D 30/0685; B29D 2030/0022; B29D 2030/0686; B29D 2030/0694; B29D 2030/0695
USPC ....... 152/204, 206, 502, 504; 156/97, 110.1, 156/115
See application file for complete search history.

(56) References Cited

U.S. PATENT DOCUMENTS

| | | | | | |
|---|---|---|---|---|---|
| 495,777 | A | * | 4/1893 | Bouery | B29D 30/0685 152/502 |
| 2004/0069387 | A1 | * | 4/2004 | Fukutomi | B29C 73/20 152/203 |
| 2020/0331305 | A1 | * | 10/2020 | Majumdar | B29D 30/0061 |

* cited by examiner

*Primary Examiner* — Robert C Dye
*Assistant Examiner* — Sedef E Paquette

(57) ABSTRACT

A sealing device comprising a flexible holding strip having an adhesive layer on a first surface, wherein the strip is configured for attachment to an inner surface of a tubeless tire via the adhesive layer, and a plurality of flexible flags attached to a second surface of the flexible holding strip opposite the first surface, wherein the plurality of flags is attached to the second surface at a fixed widthwise edge of each of the plurality of flags and wherein the plurality of flags are configured to seal a hole in the tubeless tire when the strip is attached to the inner surface of the tubeless tire is provided. Methods of protecting tires by attaching a sealing device are also described.

8 Claims, 9 Drawing Sheets

SEALING DEVICE FOR TUBELESS TIRES

FIELD OF THE INVENTION

The invention is generally related to a sealing device for preventing a flat tire caused by a puncture that may be applied to any tubeless tire.

BACKGROUND OF THE INVENTION

Pneumatic tires are utilized on all types of automobiles, trucks, motorcycles and bicycles. They generally are filled with pressurized air or nitrogen in order to provide a smooth ride and accommodate variations in road surfaces. Tubeless pneumatic tires are designed and manufactured with a heavy tread that contacts the road bed surface with a majority of the tires having an inner steel belt overlaid with plies of nylon or equivalent liners that cross over the full width of the tire and down its sides and fold into a bead that seals against the vehicle's external wheel rim. The plies are molded into the tire tread and bead to secure the many layers in place and provide a solid member to apply pressure on the rim flange that captures the tire and provides a means for sealing it against the rim and preventing escape of the pressurized air that inflated the tire.

One of the problems encountered with pneumatic tires is deflation caused by inadvertent puncture by road debris, glass, nails and the like. Once a tire is punctured, the pressurized air escapes and the tire goes flat and cannot be operated as such or receives irreparable damage to the tire and possibly the wheel rim.

There are two widely used technologies that seek to address this problem. One solution is to provide a foam that is sprayed into the tire that will expand and close the puncture. This is usually done after the puncture has happened and the tire is flat. The disadvantage of the foam sprayed into the tire is that it is not a permanent solution as the foam may solidify after a few weeks. Also, it will cause an imbalance of the tire since the foam will not be spread evenly across the entire interior of the tire which causes a centrifugal rotation imbalance that will get worse as the speed of the tire rotation increases.

Another solution is to provide a thick gel or rubber coating on the inner side of the tire. When a puncture occurs, the coating will seal the opening. The disadvantage of the gel or rubber coating is that it usually must be applied by the manufacturer of the tire, meaning, it comes with the tire and can not be applied to any tire after purchase.

Further, both solutions have the disadvantage of being affected by operating temperature. Thus, new solutions for the prevention of flat tires caused by punctures that overcome the above described disadvantages are needed.

SUMMARY

An aspect of the disclosure provides a sealing device, comprising a flexible holding strip having an adhesive layer on a first surface, wherein the strip is configured for attachment to an inner surface of a tubeless tire via the adhesive layer, and a plurality of flexible flags attached to a second surface of the flexible holding strip opposite the first surface, wherein the plurality of flags is attached to the second surface at a fixed widthwise edge of each of the plurality of flags and wherein the plurality of flags are configured to seal a hole in the tubeless tire when the strip is attached to the inner surface of the tubeless tire.

In some embodiments, each of the plurality of flags is equidistantly distributed along the second surface. In some embodiments, a free widthwise edge of a selected flag of the plurality of flags extends beyond the fixed widthwise edge of a subsequent flag of the plurality of flags. In some embodiments, the free widthwise edge of a selected flag of the plurality of flags extends 3-5 mm beyond the fixed widthwise edge of a subsequent flag of the plurality of flags. In some embodiments, each of the plurality of flags is rectangular in shape. In some embodiments, a width of each of the plurality of flags is substantially equal to a width of the holding strip. In some embodiments, a distance between each fixed widthwise edge of the plurality of flags is within a range of 2-10 cm. In some embodiments, the plurality of flags is manufactured from polyethylene. In some embodiments, the holding strip is manufactured from rubber.

Another aspect of the disclosure provides a tubeless tire comprising a sealing device as described herein attached to an inner surface of the tire.

Another aspect of the disclosure provides a sealing device, comprising a plurality of flexible flags arranged in a stack, wherein a selected flag is attached to a lower subsequent flag in the stack via an adhesive present along a fixed widthwise edge of the selected flag and wherein the plurality of flags are configured to seal a hole in the tubeless tire when the strip is attached to the inner surface of the tubeless tire.

Another aspect of the disclosure provides a method of protecting a tubeless tire from punctures, comprising attaching a plurality of flexible flags to an inner surface of the tire via an adhesive arranged between a fixed widthwise edge of the flag and the inner surface, wherein the plurality of flags are configured to seal a hole in the tubeless tire.

In some embodiments, the plurality of flags are arranged on a flexible holding strip, wherein the flexible holding strip has an adhesive layer on a surface opposite the plurality of flags, and wherein the strip is attached to the inner surface of the tubeless tire via the adhesive layer. In some embodiments, a protective backing is removed from an adhesive present on the plurality of flexible flags prior to the attaching step. In some embodiments, the attaching step is performed such that a free widthwise edge of a selected flag of the plurality of flags extends beyond the fixed widthwise edge of a subsequent flag of the plurality of flags.

BRIEF DESCRIPTION OF THE DRAWINGS

FIG. 8A shows a stack of flags and a layer of glue between each flag, with no protective backing between successive flags in the stack; FIG. 8B shows an individual flag after peeling from the stack; FIG. 8C shows an enlarged view of the junction area between the individual flag and the lower portion where the glue is applied.

FIG. 9A shows a stack of flags with a layer of glue between each flag, and a protective backing between each flag and a next in the stack; FIG. 9B shows an individual flag after peeling from the stack and shows the protective backing still in place; FIG. 9C shows an enlarged view of the junction area between the individual flag and the lower portion where the glue is applied showing the lower part of the flag, the glue and the protective backing.

FIG. 10A shows a top view; FIG. 10B shows a bottom view of an individual flag.

DETAILED DESCRIPTION

Embodiments of the disclosure provide a sealing device that prevents deflation of a tubeless tire when punctured. Unlike previous sealing technologies, a sealing device as described herein does not use any liquid, gel or foam for sealing the puncture hole. The device can be applied to any tubeless tire on any type of vehicle (bicycle, car, truck, etc.) without the need for any special tools, without causing damage to the tire, and without affecting wheel balancing.

Figure 1:
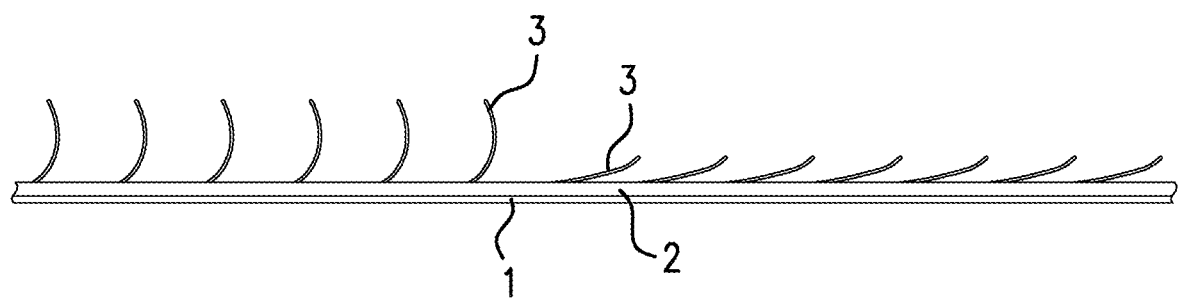
FIG. 1. Side view of a sealing device according to some embodiments of the disclosure.
Figure 2:
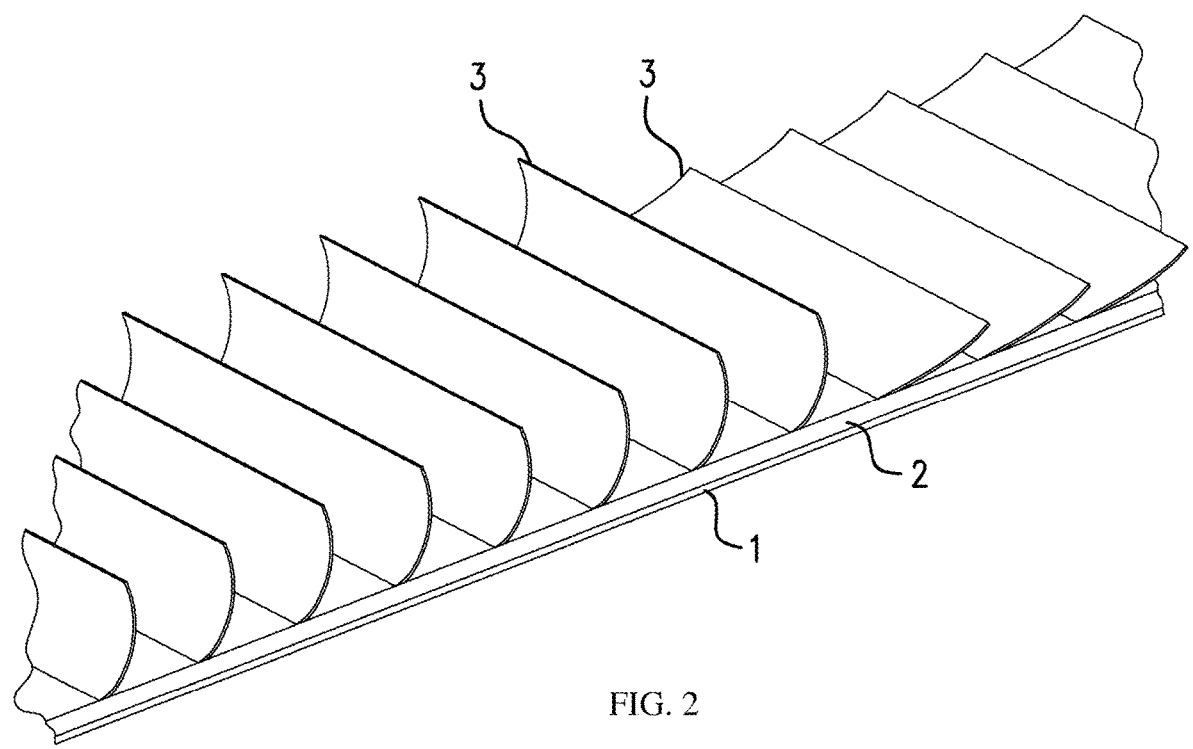
FIG. 2. Top view of a sealing device according to some embodiments of the disclosure.
Figure 3:
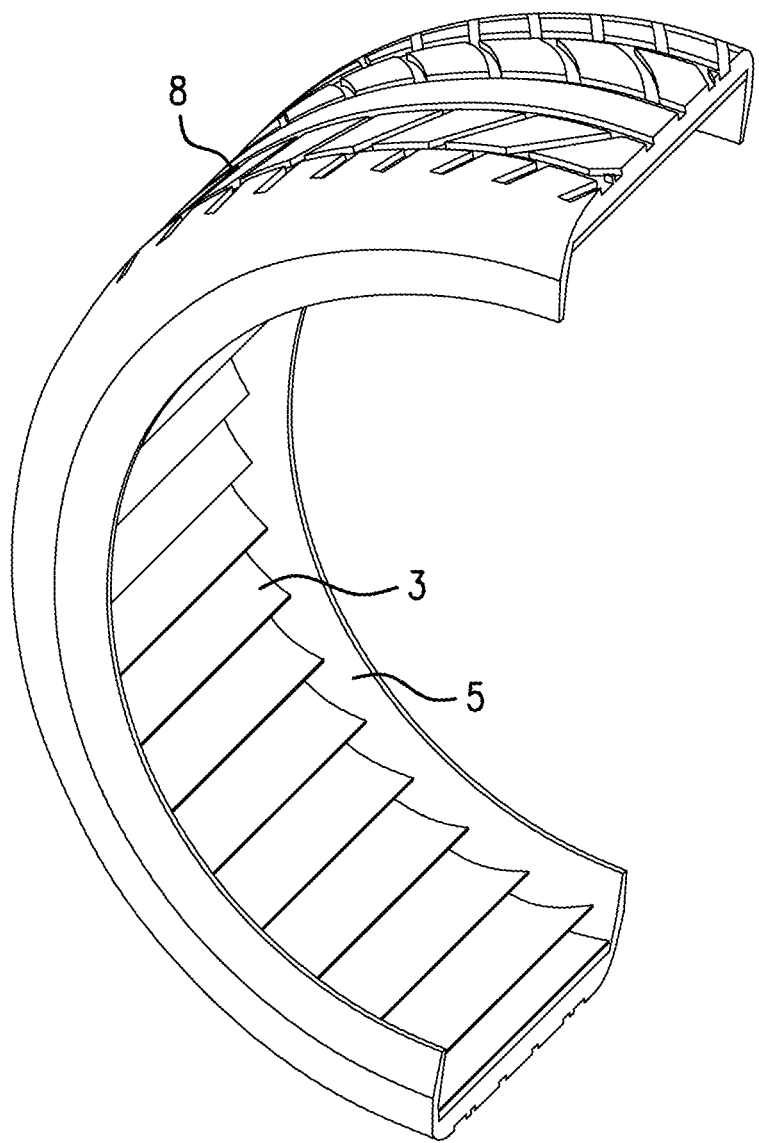
FIG. 3. Cross-section view of a tire having a sealing device installed according to some embodiments of the disclosure.
Figure 4:
FIG. 4. A tubeless tire having a sealing device installed according to some embodiments of the disclosure.
Figure 5:
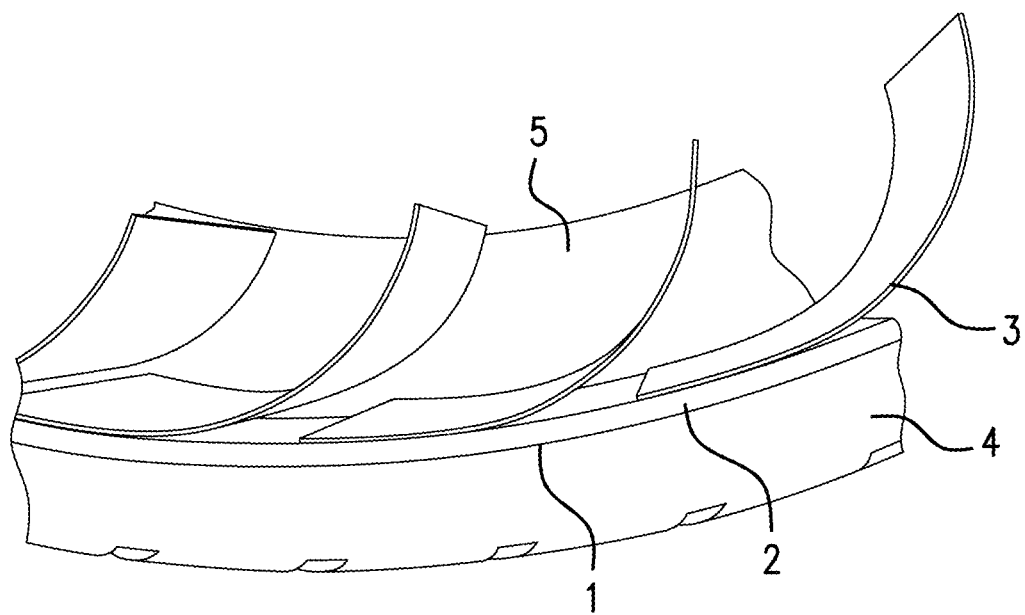
FIG. 5. Cross-section side view of a tire having a sealing device installed according to some embodiments of the disclosure.
Figure 6:
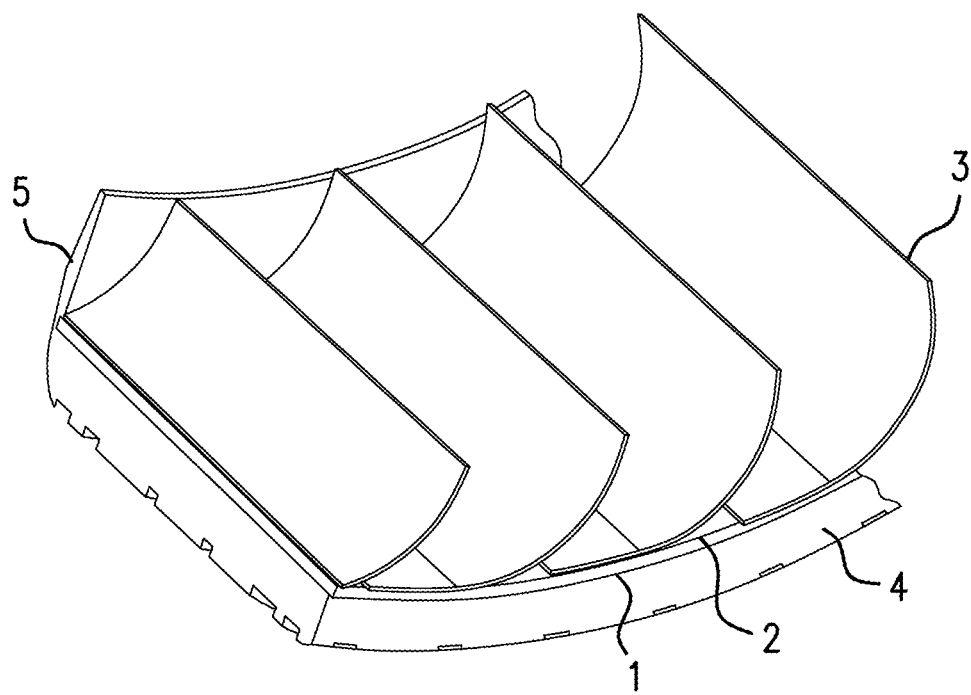
FIG. 6. Cross-section top view of a tire having a sealing device installed according to some embodiments of the disclosure.

With reference to FIGS. 1 and 2, a sealing device according to embodiments of the disclosure comprises a flexible holding strip (2) having an adhesive layer (1) on a first surface of the strip. A plurality of flexible flags (3) are attached to a second surface of the flexible holding strip opposite the first surface.

The holding strip (2) is made from a light and flexible material such that the strip can conform to the shape of the inner surface of a tire. Suitable materials include, but are not limited to, nylon, rubber, cellophane, polymeric film, foil, nonwoven or woven cloth or fabric. It may also be made from polymeric films such as polyethylene and polyester. The holding strip may include a reinforcement layer of woven or knitted cloth or fabric, etc. It is preferable that the material is easily puncturable such that a nail or other puncturing means can pass through the strip to reach the interior of a tire. Thus, when a puncture occurs, air can escape through the resulting crack or hole which will suction a flag attached to the strip into the puncture site thus providing an effective seal.

The width of the holding strip (2) may be substantially equal to the internal width of the tire to be protected. Thus, different widths of strip material may be provided to meet standard internal tire widths in production for motorcycles, cars, vans, trucks, etc. Each specific width may be provided as a roll which may be cut to a desired length for covering the inner circumference of the tire to be protected. In some embodiments, pre-cut strips are manufactured for common tire sizes. For example, common strip lengths include 635 mm, 724 mm, 775 mm for tire sizes: 195/65R15, 225/65R17, 245/70R17, respectively as shown in table 1. In some embodiments, the thickness of the holding strip is about 3 mm or less, e.g. 2 mm or less or 1.0 mm or less.

TABLE 1

| Strip length for different tire sizes (values obtained from: tyresizecalculator.com/tyre-wheel-calculators/tire-size-calculator-tire-dimensions) | |
|---|---|
| Tire Size | Strip Length in mm |
| 195/65R15 | 635 |
| 225/65R17 | 724 |
| 245/70R17 | 775 |

The adhesive layer (1) on the holding strip (2) is configured for attachment of the strip to the inner surface of a tubeless tire. In some embodiments, the adhesive layer covers the entire width and length of a surface of the holding strip. In some embodiments, the adhesive layer is covered with a nonstick paper backing that can be easily peeled off before the application of the strip to the interior of the tire. In some embodiments, the thickness of the adhesive layer is about 2 mm or less, e.g. 1.5 mm or less or 1 mm or less. Preferably, the adhesive has a long shelf life (e.g. 3 years or more) and is water, heat, and cold resistant. It is also preferred if the adhesive remains flexible after application and does not become dry or solid with time. Suitable adhesives include, but are not limited to, acrylic, rubber or silicone based adhesives. It could be a "pressure-sensitive adhesive" or one that forms a chemical bond with the tire.

A "pressure-sensitive adhesive" does not stick by forming chemical bonds with the material it is placed on, instead applied pressure forces the glue to penetrate the tiniest microscopic irregularities on the material's surface. Once there, it will resist coming back out, thus keeping the tape stuck in place. The glue "has to be halfway between liquid and solid,": fluid enough to spread under pressure but viscous enough to resist flowing.

The holding strip (2) surface opposite the adhesive layer (1) contains a plurality of flexible flags (3) attached to the strip at a fixed widthwise edge, thus leaving a portion of the flag that is not attached to the strip (2). This free portion of the flags will be suctioned into a hole/crack when a tire puncture occurs. The flags (3) are made from a material that is configured to seal a hole in the tubeless tire when the tire and strip have been punctured, e.g. the material used to produce supermarket plastic bags. Suitable materials include, but are not limited to, polyethylene, nylon, cellophane polyethylene and polyester. In some embodiments, the flags (3) are rectangular in shape. Preferably, the flags (3) are substantially equal to the width of the holding strip (2). In some embodiments, the flags (3) have a length of 10-20 cm, e.g. about 15 cm.

The fixed edge of the flags may be attached to the strip via an adhesive, staple, or other attachment means. In some embodiments, the length of the fixed edge is about 1-20 mm, thus leaving the majority of the flag non-adhered to the strip. In some embodiments, the fixed edge of each flag is spaced from the subsequent fixed edge of a flag by 2-20 cm, e.g. 5-15 cm, e.g. 3 cm. It is contemplated that the fixed edge of larger flags could have a greater distance between them as long as the spacing is smaller than the height of each flag to allow for some overlap. In some embodiments, the free non-adhered edge of a flag overlaps a subsequent flag to cover at least as much as the adhered portion of the adjacent flag. In some embodiments, adjacent flags overlap more or less than the adhered portion of an adjacent flag. In some embodiments, there is 1-20 mm of overlap, e.g. 2-8 mm or 3-5 mm.

Referring to FIGS. 3-6, a sealing device as described herein may be installed in the interior surface of a tubeless tire (8). A method of installation may comprise cutting the holding strip (2) to a length equal to the inner circumference of the tire to be protected. If present, the protective backing on the strip (2) may be removed to expose the adhesive surface (1). The adhesive surface is then placed on the inner side of the tire (4). In some embodiments, the device may be placed onto an inner surface of the tire sidewall (5). In some embodiments, a tire may be provided with the sealing device pre-installed.

Figure 7:
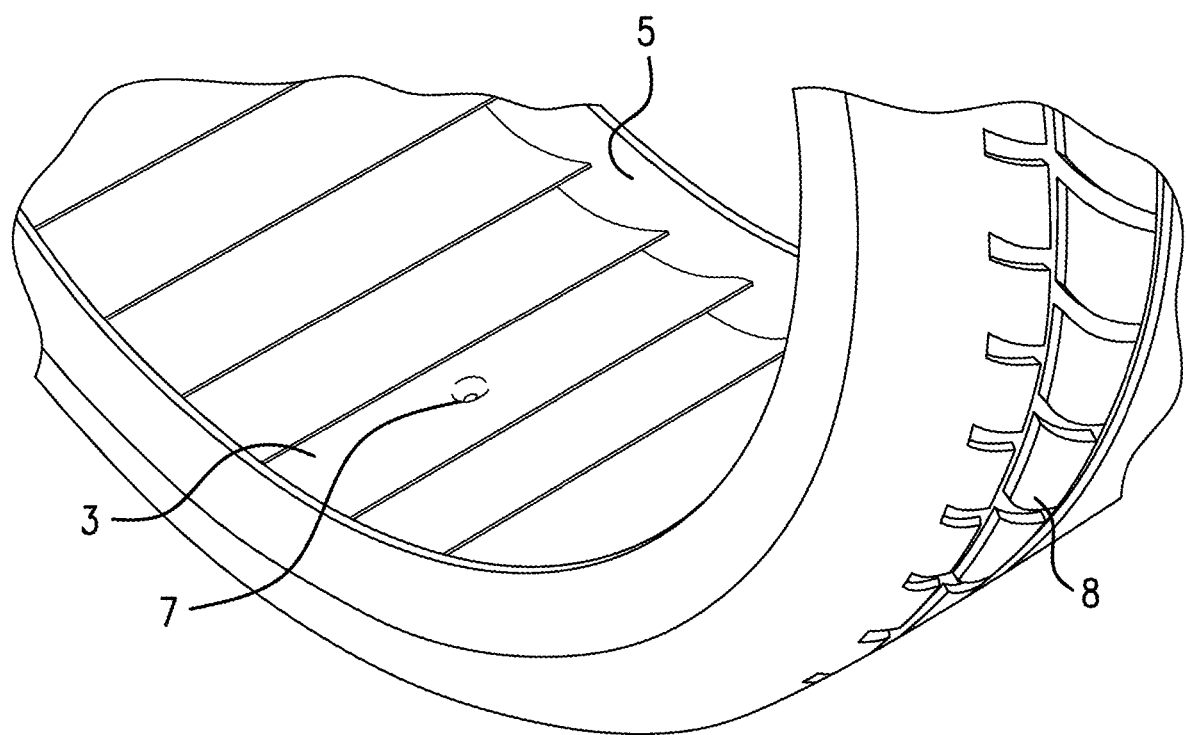
FIG. 7. Illustration of a punctured tire having a flag of a sealing device occupying the puncture site according to some embodiments of the disclosure.

With reference to FIG. 7, if there is a puncture in the tire (8), the air will move from inside the tire to the outside of the tire through the puncture hole (7) due to the pressure difference. This pressure difference and air flow will pull the flag material (3) into the hole (7). The flag material will be squeezed and stuck in the hole thus blocking it and stopping the loss of air from the tire.

Figures 8A, 8B, 8C:
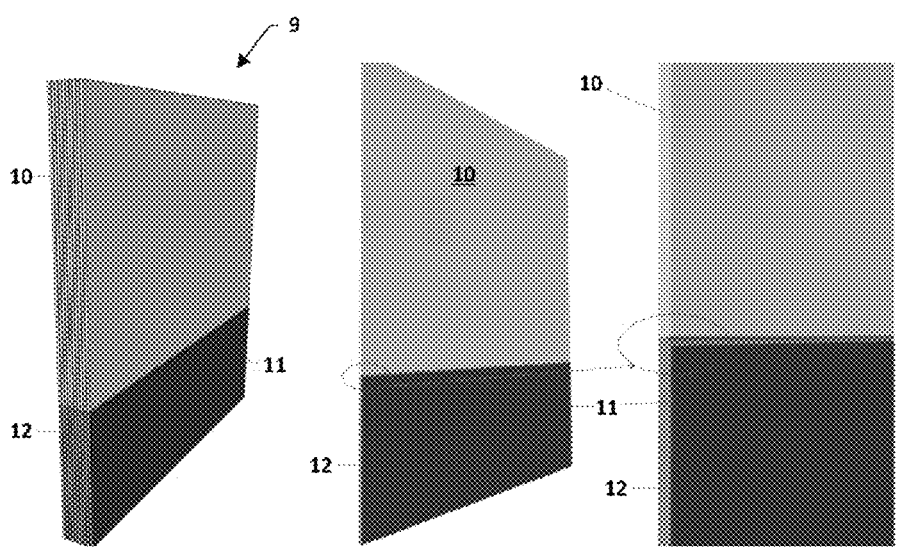
FIG. 8A-8C.
Figure 9A:
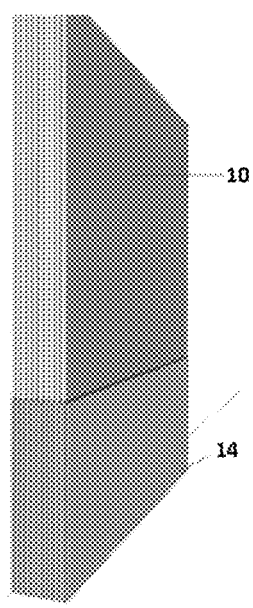
FIG. 9A-9C.
Figure 9B:
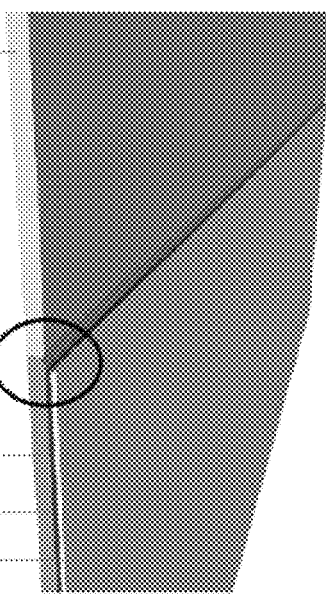
Figure 9C:
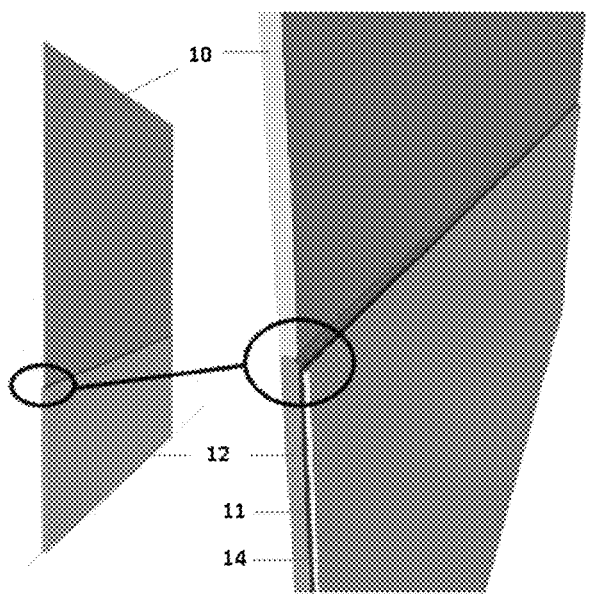
Figure 10A:
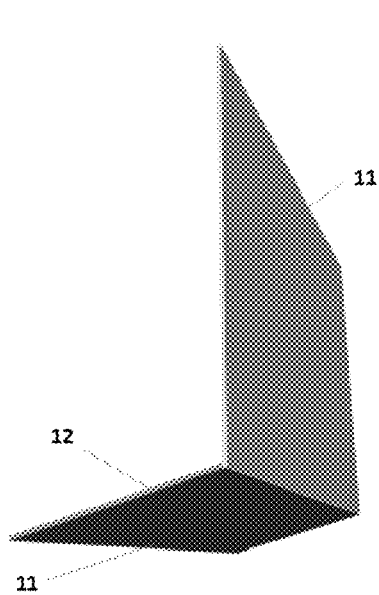
FIG. 10A-10B.
Figure 10B:
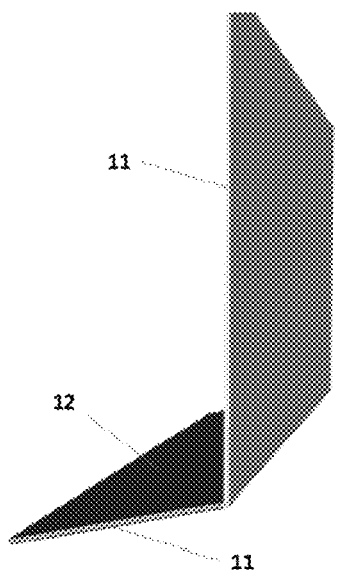

Providing the sealing device as described herein as a roll having a holding strip with attached flags makes application of the device particularly straightforward giving a uniform result. Alternatively, it is contemplated that the flags may be provided without a holding strip but may be attached directly and individually to the interior surface of a tire. For example, with reference to FIG. 8A 11811, the plurality of flags may be provided as a stack (9) (e.g. similar to a deck of cards) where a selected flag (10) is attached to a lower subsequent flag in the stack via an adhesive (11) present along a fixed widthwise edge (12) of the selected flag. Each flag may then be "peeled" away, as shown in FIGS. 8B and 8C, from the stack and the same adhesive surface used to stack the flags would then be attached to the tire. In some embodiments, an additional adhesive may be applied for a stronger attachment to the tire. Alternatively, as seen in FIGS. 9A and 9B, and in closer detail in FIG. 9C, each flag of the stack may have a protective backing (14) covering the adhesive portion (11). The protective backing (14) is peeled away before the flag is applied to the tire, thus, the flags are not attached to each other in the stack. An individual flag removed from a stack is shown in FIGS. 10A and 10B.

Before exemplary embodiments of the present invention are described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the invention has been described in terms of its preferred embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

I claim:

1. A method of protecting a tubeless tire from punctures, comprising:

peeling individual flexible flags from a stack of a plurality of flexible flags, wherein the plurality of flexible flags are held together by an adhesive on a fixed widthwise edge of the individual flexible flags; and attaching individually the plurality of flexible flags to an inner surface of the tubeless tire, via the adhesive arranged between the fixed widthwise edge of the individual flexible flag and the inner surface of the tubeless tire, wherein:

the individual flexible flags are configured to seal a hole in the tubeless tire, in response to an occurrence of the hole, the attaching step includes attaching each of the individual flexible flags in an orientation in which the fixed widthwise edge extends parallel to a width direction of the tubeless tire, the fixed widthwise edge of the flexible flags extends a length that is more than one-half the spacing between inner sidewalls of the tubeless tire.

2. The method of claim 1, wherein the attaching step is configured to provide an overlap of a free widthwise edge of a selected flexible flag of the plurality of flexible flags extending beyond the fixed widthwise edge of another flexible flag among of the plurality of flexible flags.

3. The method of claim 1, wherein the attaching step is performed such that a distance between each fixed widthwise edge of the plurality of flags is within a range of 2-10 cm.

4. The method of claim 1, wherein each of the plurality of flexible flags is rectangular in shape.

5. The method of claim 1, wherein the plurality of flexible ef flags are manufactured from a material selected from the group consisting of polyethylene, nylon, cellophane polyethylene, and polyester.

6. The method of claim 1, wherein the flexible flags comprise a material and have a thickness configured to provide, in combination, a flexibility and enablement of puncture that both
   (i) enable a nail or other puncturing means that passes through the tubeless tire at a location of an individual flexible flag among the plurality of flexible flags, to pass through the individual flexible flag and reach the interior of the tubeless tire, and
   (ii) enable the flag material, in response to a pressure differential between air in the interior of the tire and exterior atmospheric pressure, to squeeze into and stick within a hole or crack in the tubeless tire resulting from the puncture.

7. The method of claim 1, wherein:
each of the individual flexible flags extends a height from the fixed widthwise edge, in a height direction that is perpendicular to the extending length of the fixed widthwise edge, to a free non-adhered edge,
the length of the fixed widthwise edge is not less than 10 centimeters, and
the height is not less than 2.02 centimeters and not more than 20.08 centimeters.

8. The method of claim 1, wherein the length of the fixed widthwise edge is approximately the spacing between inner sidewalls of the tubeless tire.

* * * * *